United States Patent
Zhang

(10) Patent No.: US 10,258,871 B2
(45) Date of Patent: *Apr. 16, 2019

(54) METHOD AND DEVICE FOR GENERATING SOUNDS EFFECTS FOR A GAME

(71) Applicant: Tencent Technology (Shenzhen) Company Limited, Shenzhen (CN)

(72) Inventor: Weilin Zhang, Shenzhen (CN)

(73) Assignee: TENCENT TECHNOLOGY (SHENZHEN) COMPANY LIMITED, Shenzhen, Guandgong Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/976,678

(22) Filed: May 10, 2018

(65) Prior Publication Data

US 2018/0256970 A1   Sep. 13, 2018

Related U.S. Application Data

(63) Continuation of application No. 14/260,035, filed on Apr. 23, 2014, now Pat. No. 9,993,722, which is a
(Continued)

(30) Foreign Application Priority Data

Dec. 25, 2012   (CN) .......................... 2012 1 0571986

(51) Int. Cl.
*A63F 13/00* (2014.01)
*G06F 3/16* (2006.01)
(Continued)

(52) U.S. Cl.
CPC .............. *A63F 13/00* (2013.01); *A63F 13/12* (2013.01); *A63F 13/54* (2014.09); *A63F 13/60* (2014.09);
(Continued)

(58) Field of Classification Search
CPC .......... A63F 13/00; A63F 13/60; A63F 13/54; A63F 2300/6081; A63F 2300/6063; G06F 3/167
(Continued)

(56) References Cited

U.S. PATENT DOCUMENTS

| 4,067,049 A | 1/1978 | Kelly et al. |
| 5,675,753 A | 10/1997 | Hansen et al. |

(Continued)

FOREIGN PATENT DOCUMENTS

| CN | 101047879 A | 10/2007 |
| CN | 101094107 A | 12/2007 |

(Continued)

OTHER PUBLICATIONS

Tencent Technology, ISRWO, PCT/CN2013/088385, Mar. 6, 2014, 8 pgs.
(Continued)

*Primary Examiner* — Michael A Cuff
(74) *Attorney, Agent, or Firm* — Morgan, Lewis & Bockius LLP

(57) ABSTRACT

An electronic device identifies a plurality of scene elements within a plurality of sample game scenes within a game and a plurality of sound effect units within a plurality of audio files existing in the game and generates a scene element library containing one or more of the plurality of sound effect units in association with each of a plurality of scene elements in accordance with a predefined matching strategy, the scene element library including a list of possible scene elements for constructing game scenes. After obtaining a scene element template for a respective scene in the game, the electronic device also selects one or more corresponding sound effect units for each of the one or more constituent scene elements in the scene element template for the respec-
(Continued)

tive scene. The electronic device further generates a composite sound effect for the respective scene using the selected sound effect units.

18 Claims, 10 Drawing Sheets

Related U.S. Application Data continuation of application No. PCT/CN2013/088385, filed on Dec. 3, 2013.

(51) Int. Cl.
    *A63F 13/30*     (2014.01)
    *A63F 13/60*     (2014.01)
    *A63F 13/54*     (2014.01)

(52) U.S. Cl.
    CPC ...... *G06F 3/167* (2013.01); *A63F 2300/6081* (2013.01)

(58) Field of Classification Search
    USPC .......................................................... 463/35
    See application file for complete search history.

(56) References Cited

U.S. PATENT DOCUMENTS

| | | |
|---|---|---|
| 5,890,115 A | 3/1999 | Cole |
| 7,091,948 B2 | 8/2006 | Chang et al. |
| 7,563,168 B2 | 7/2009 | Jahnke |
| 8,602,887 B2 | 12/2013 | Tardif et al. |
| 8,622,831 B2 | 1/2014 | Ham |
| 9,351,092 B2 | 5/2016 | Muramatsu et al. |
| 2002/0163498 A1 | 11/2002 | Chang et al. |
| 2004/0170288 A1 | 9/2004 | Maeda |
| 2009/0013858 A1 | 1/2009 | Obermeier |
| 2009/0264181 A1 | 10/2009 | Timperley |
| 2011/0182438 A1 | 7/2011 | Koike et al. |
| 2012/0047130 A1 | 2/2012 | Perez et al. |
| 2012/0072451 A1 | 3/2012 | Merrifield et al. |
| 2012/0278103 A1 | 11/2012 | Homchowdhury et al. |
| 2013/0339907 A1 | 12/2013 | Matas et al. |

FOREIGN PATENT DOCUMENTS

| | | |
|---|---|---|
| CN | 101359391 A | 2/2009 |
| CN | 101894004 A | 11/2010 |

OTHER PUBLICATIONS

Tencent Technology, IPRP, PCT/CN2013/088385, Jun. 30, 2015, 6 pgs.

Scene Element Library 200

| | | | | |
|---|---|---|---|---|
| Character 1 | Sound Effect Unit 1 | Sound Effect Unit 2 | • • • | Sound Effect Unit M |
| Character 2 | Sound Effect Unit 1 | Sound Effect Unit 2 | • • • | Sound Effect Unit M |
| ⋮ | | • • • | | |
| Character N | Sound Effect Unit 1 | Sound Effect Unit 2 | • • • | Sound Effect Unit M |
| Action 1 | Sound Effect Unit 1 | Sound Effect Unit 2 | • • • | Sound Effect Unit M |
| Action 2 | Sound Effect Unit 1 | Sound Effect Unit 2 | • • • | Sound Effect Unit M |
| ⋮ | | • • • | | |
| Action N | Sound Effect Unit 1 | Sound Effect Unit 2 | • • • | Sound Effect Unit M |
| Object 1 | Sound Effect Unit 1 | Sound Effect Unit 2 | • • • | Sound Effect Unit M |
| Object 2 | Sound Effect Unit 1 | Sound Effect Unit 2 | • • • | Sound Effect Unit M |
| ⋮ | | • • • | | |
| Object N | Sound Effect Unit 1 | Sound Effect Unit 2 | • • • | Sound Effect Unit M |
| Environment Feature 1 | Sound Effect Unit 1 | Sound Effect Unit 2 | • • • | Sound Effect Unit M |
| Environment Feature 2 | Sound Effect Unit 1 | Sound Effect Unit 2 | • • • | Sound Effect Unit M |
| ⋮ | | • • • | | |
| Environment Feature N | Sound Effect Unit 1 | Sound Effect Unit 2 | • • • | Sound Effect Unit M |
| ⋮ | | • • • | | |

Figure 2

Scene Element
Template 300

| Time Interval 302-1 | Scene Element 304-1 | Scene Element 304-2 | • • • | Scene Element 304-M |
|---|---|---|---|---|
| Time Interval 302-2 | Scene Element 306-1 | Scene Element 306-2 | • • • | Scene Element 306-M |
| Time Interval 302-3 | Scene Element 308-1 | Scene Element 308-2 | • • • | Scene Element 308-M |
| • • • | | • • • | | |
| Time Interval 302-N | Scene Element 310-1 | Scene Element 310-2 | • • • | Scene Element 310-M |

Figure 3

METHOD AND DEVICE FOR GENERATING SOUNDS EFFECTS FOR A GAME

RELATED APPLICATIONS

This application is a continuation application of U.S. application Ser. No. 14/260,035, filed Apr. 23, 2014, entitled "METHOD AND DEVICE FOR GENERATING SOUNDS EFFECTS FOR A GAME", which is a continuation application of PCT Patent Application No. PCT/CN2013/088385, entitled "METHOD AND DEVICE FOR GENERATING SOUNDS EFFECTS FOR A GAME" filed Dec. 3, 2013, which claims priority to Chinese Patent Application Serial No. 201210571986.9, entitled "METHOD AND TERMINAL FOR GENERATING SOUNDS EFFECTS FOR A GAME" filed Dec. 25, 2012, all of which are incorporated herein by reference.

TECHNICAL FIELD

The present disclosure relates to the field of Internet technologies, and more particularly to a method and device for generating sound effects for a game.

BACKGROUND

With the development and popularization of the Internet, games have become one of the main applications utilizing the Internet. More and more Internet users are participating in online games. In general, types of Internet games include: large multi-player online games; stand-alone games; online games supporting instant message; or other online games. Regardless of the game type, in the client-side portion of the game, audio generated for different in-game scenarios is played to enhance the user's participation in the game.

However, in the conventional client-side portion of the game, this requires that sound effects corresponding to each in-game scenario or scene in-game is developed and created separately. Furthermore, sound effects or in-game scenes become very monotonous, because the sound effects are played repeatedly for the in-game scene. This brings about music fatigue for the player of the game and reduces the player's experience.

SUMMARY

The embodiments of the present application provide a method and device for generating sound effects for a respective scene of a game. In some embodiments, the method is performed at an electronic device with one or more processors and memory (e.g., client device 702, FIGS. 7-8 associated with a user playing the game or computing device 730, FIGS. 7 and 10 associated with a developer of the game). The method includes: identifying a plurality of scene elements within a plurality of sample game scenes within a game and a plurality of sound effect units within a plurality of audio files existing in the game; generating a scene element library containing one or more of the plurality of sound effect units in association with each of a plurality of scene elements in accordance with a predefined matching strategy, the scene element library including a list of possible scene elements for constructing game scenes; obtaining a scene element template for a respective scene in the game, the scene element template including one or more constituent scene elements of the respective scene; selecting one or more corresponding sound effect units for each of the one or more constituent scene elements in the scene element template for the respective scene, further including selecting at least one of the one or more sound effect units for a first one of the one or more constituent scene elements in the scene element template in accordance with user feedback from a community of users; and generating a composite sound effect for the respective scene using the selected sound effect units.

In some embodiments, an electronic device (e.g., client device 702, FIGS. 7-8 or computing device 730, FIGS. 7 and 10) each include one or more processors and memory storing one or more programs for execution by the one or more processors, the one or more programs include instructions for performing the operations of the methods described above. In some embodiments, a non-transitory computer readable storage medium storing one or more programs, the one or more programs comprising instructions, which, when executed by an electronic device (e.g., client device 702, FIGS. 7-8 or computing device 730, FIGS. 7 and 10) each with one or more processors, cause the electronic device to perform the operations of the methods described above.

Various advantages of the present application would be apparent in light of the descriptions below.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

In order to explain the technical program in the embodiment of the present application clearly, the following will briefly introduce the attached drawings required in the description of the embodiment or the conventional technology, obviously, the drawings in the following description are only some embodiments of the present application, for the common technicians of this field, they can also obtain other drawings according to these drawings without any creative labor.

FIG. 2 is a block diagram of a data structure for a scene element library in accordance with some embodiments.

FIG. 3 is a block diagram of a data structure for a scene element template in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following gives specific description of embodiment of the present application in combination of attached drawings.

Figure 1:
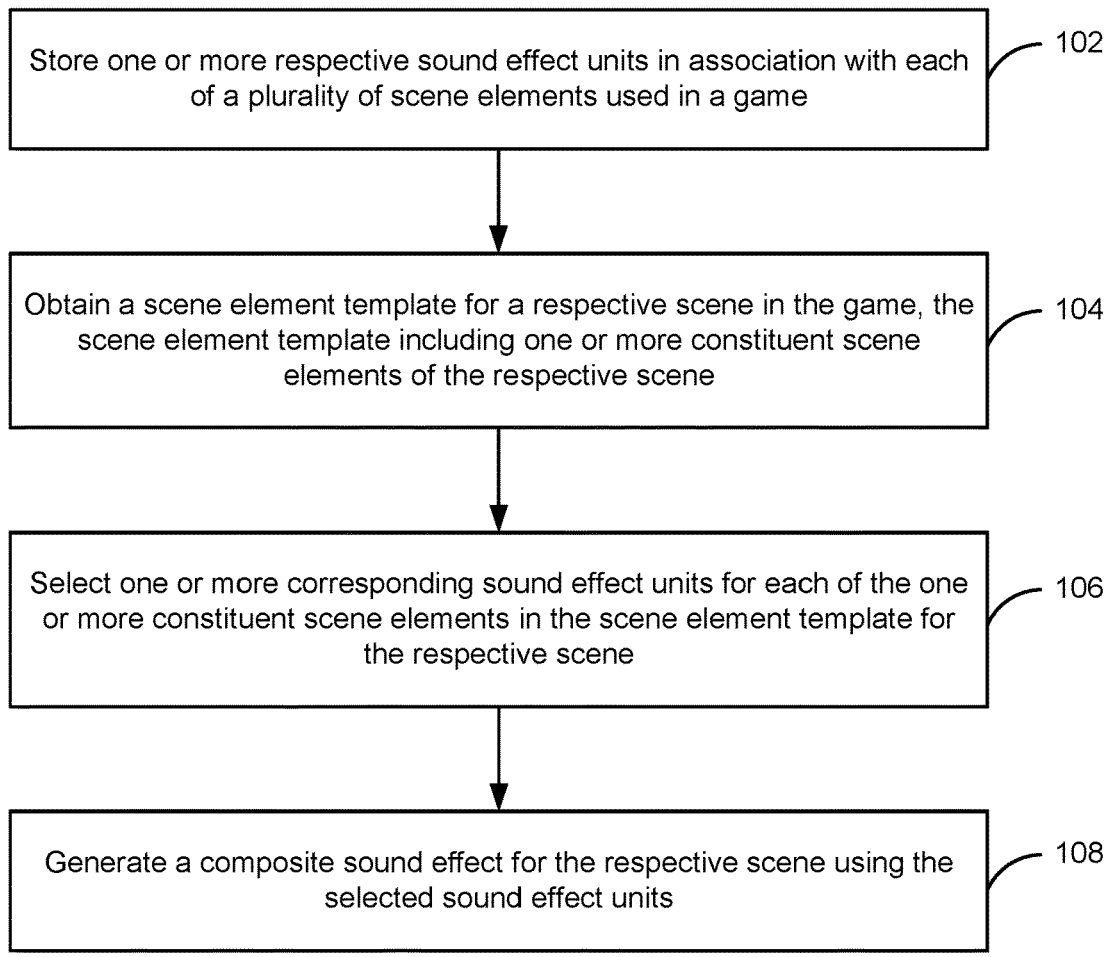
FIG. 1 is a flowchart diagram of a method of generating sound effects for a respective scene of a game in accordance with some embodiments.

FIG. 1 is a flowchart diagram of a method of generating sound effects for a respective scene of a game in accordance with some embodiments. At least in some embodiments, the method is performed by an electronic device (e.g., client device 702, FIGS. 7-8 associated with a user playing the game or computing device 730, FIGS. 7 and 10 associated with a developer of the game) with one or more processors and memory, or one or more components of the electronic device (e.g., client-side module 704, FIGS. 7-8 or audio processing module 600/650, FIG. 10). In some embodiments, the method is governed by instructions that are stored in a non-transitory computer readable storage medium and that are executed by one or more processors of an electronic device (e.g., processor(s) 802 of client device 702, FIG. 8 or processor(s) 1002 of computing device 730, FIG. 10).

In some embodiments, prior to the storing, the electronic device generates a scene element library containing a list of possible scene elements for constructing game scenes (e.g., scene element library 200, FIG. 2). For example, the scene element library is generated based on the scenes in the one or more video files for rendering the game. In another example, the scene element library is created by a developer that matches possible scene elements with sound effect units. In some embodiments, the scene element library can be utilized for more than one game.

The electronic device stores (102) one or more respective sound effect units in association with each of a plurality of scene elements used in a game. In some embodiments, each game scene is described by a collection of one or more scene elements. For example, the scene elements include participating game characters, items, weapons, actions by the characters, effects of the actions or use of items, characteristics of the atmosphere or mood in the scene, or characteristics of the environment depicted in the scene, and the like. In some embodiments, a respective scene element (e.g., dragon, user's character, companion character, horse, weapon, etc.) is associated with a set of sound effect units including different sound clips (e.g., breath, roar, fire, laugh, a segment of descriptive music, etc. associated with the dragon) and/or transformations of a default sound clip (e.g., varying speed, pitch, intonation, instrument, etc.) associated with the scene element.

In some embodiments, the electronic device (e.g., associated with the user playing the game) dynamically determines the respective scene during game play. For example, client device 702 dynamically determines the in-game scene and its constituent scene elements based on the video file(s) being rendered for game play. In this example, client device 702 determines the in-game scene based on the user's character's surroundings and/or in-game location.

The electronic device obtains (104) a scene element template for a respective scene in the game, the scene element template including one or more constituent scene elements of the respective scene. In some embodiments, each in-game scene is associated with a scene element template. In some embodiments, the scene elements in the scene element template include characters, actions, items, moods, environment elements, etc. For example, a scene element template associated with a game scene in which the user's character is rescuing another character from a dragon includes: dragon, user's character, user's character's companion, user's character's rescuee being held by the dragon, user's character's weapon, user's character's horse, and forest or other in-game environments. In some embodiments, the scene element templates are created by a developer for all cut-scenes in the game.

In some embodiments, the one or more scene elements in the scene element template are arranged according to a time sequence with a plurality of time intervals. For example, a time sequence with a plurality of time intervals or timestamps corresponds to the respective scene associated with the scene element template. Furthermore, one or more scene elements are associated each of the time intervals or timestamps in the time sequence for the respective scene. In some embodiments, two or more scene elements are associated with a same time interval of the plurality of time intervals in the time sequence. For example, if three scene elements are associated with the same timestamp, the sound effect units associated with the three scene elements are concatenated, mixed or prioritized.

In some embodiments, obtaining the scene element template for the respective scene includes generating the scene element template based on the determined respective scene. In some embodiments, the scene element template is dynamically created by client device 702 associated with the user playing the game. For example, client device 702 dynamically creates the scene element template to match the rendered scene for the game.

Figure 7:
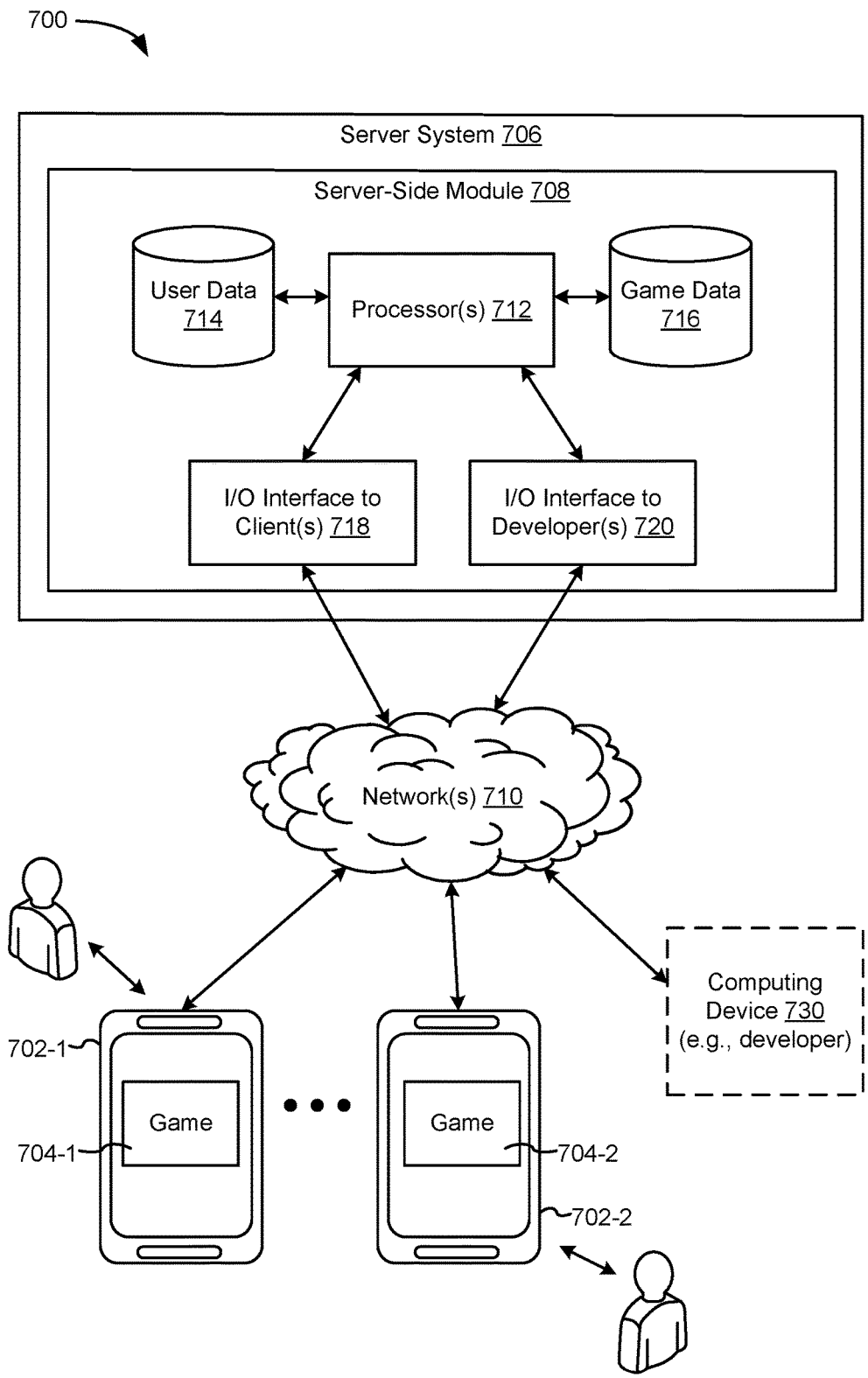
FIG. 7 is a block diagram of a server-client environment in accordance with some embodiments.
Figure 10:
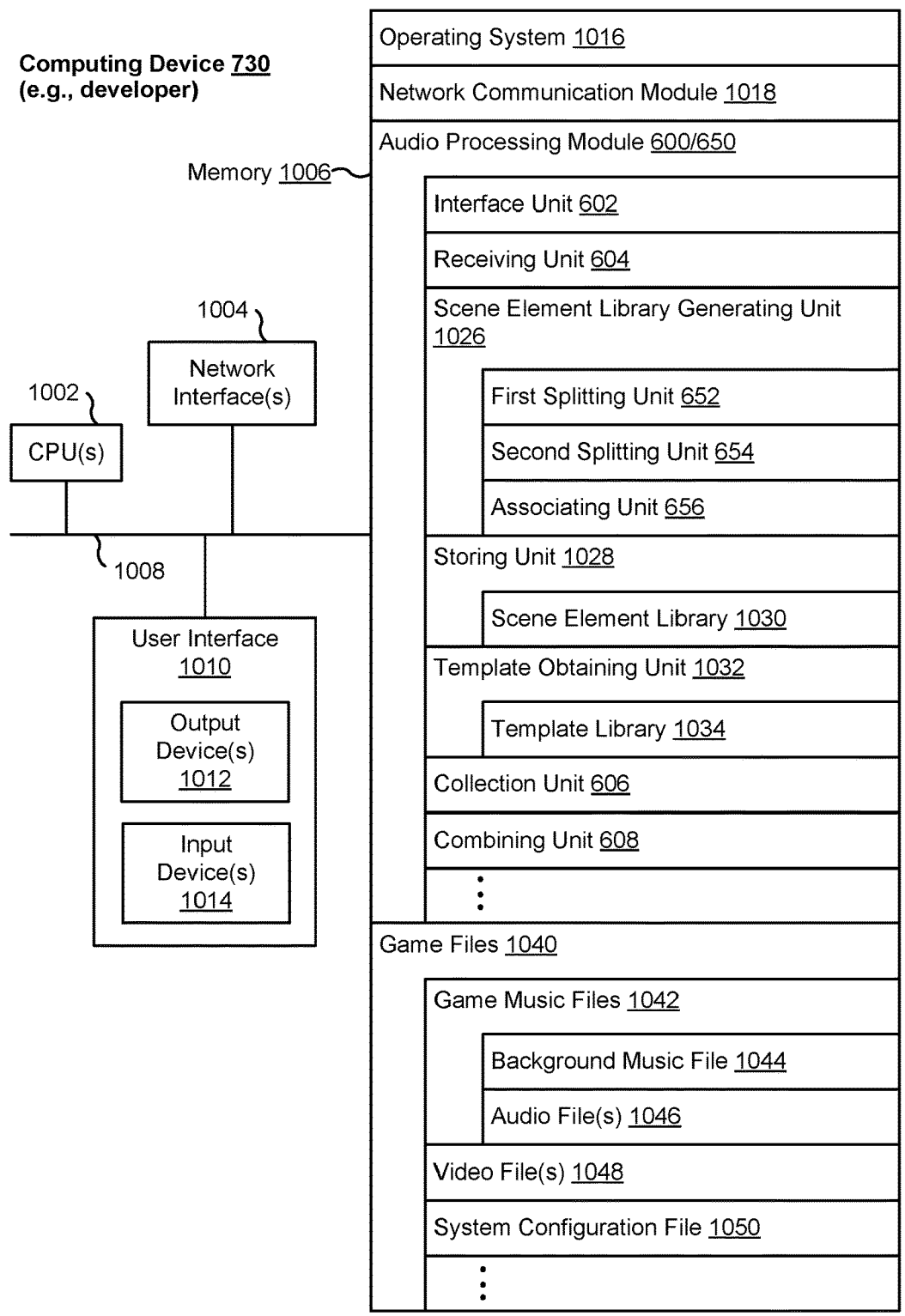
FIG. 10 is a block diagram of a computing device in accordance with some embodiments.

In some embodiments, a template library including a plurality of scene element templates for a game is generated or predetermined by a developer (e.g., associated with computing device 730, FIGS. 7 and 10). Thereafter, the template library is stored at the user's electronic device (e.g., client device 702, FIGS. 7-8) in one of the game files associated with the game and obtaining the scene element template for the respective scene includes selecting a scene element template for the respective scene from the template library.

The electronic device selects (106) one or more corresponding sound effect units for each of the one or more constituent scene elements in the scene element template for the respective scene. In some embodiments, the one or more sound effect units for each of the scene elements corresponding to the respective scene are intelligently selected based on the other scene elements in the scene element template for the respective scene. In some embodiments, the one or more sound effect units for a respective scene element corresponding to the respective scene are randomly selected from a set of sound effect units associated with the respective scene element.

The electronic device generates (108) a composite sound effect for the respective scene using the selected sound effect units. In some embodiments, the sound effect units are concatenated (or applied, in cases where the sound effect unit is a transformation) according to their temporal order in the scene element template (e.g., determined by the time sequence) to generate the composite sound effect for the respective scene.

In some embodiments, after generating the composite sound effect for the respective scene, the electronic device presents the composite sound effect in real-time during game play. In some embodiments, the composite sound effect is generated at computing device 730 associated with the developer and stored for later use at client device 702 associated with the user playing the game.

In some embodiments, the electronic device dynamically generates the composite sound effect during game play. In some embodiments, the composite sound effect is generated on-the-spot upon the user's character reaching a location in-game or satisfying a condition (e.g., finishing a level, unlocking an achievement, defeating a boss, etc.). For example, the composite sound effect is associated with a cut-scene between levels of the game. In this example, the composite sound effect is based at least in part on scene elements associated with a previous level (e.g., the user's character health and armor worn when finishing the previous level, and environmental characteristics such as the weather in the environment when finishing the previous level).

In some embodiments, each of the selected sound effect units is randomly selected from a set of respective sound effect units stored in association with a respective constituent scene element of the scene element template. In some embodiments, each of the selected sound effect units is intelligently selected from a set of respective sound effect units stored in association with a respective constituent scene element of the scene element template based on the other scene elements in the scene element template. In some embodiments, the scene element template includes a pointer corresponding to a scene element in the scene element library and a sound effect unit associated with the scene element is selected at random from a set of sound effect units stored in association with the scene element in the database. In some embodiments, the sound effect units are selected according to user feedback from a community of users.

FIG. 2 is a block diagram of a data structure for a scene element library 200 in accordance with some embodiments. In some embodiments, scene element library 200 includes a plurality of scene elements (e.g., organized into categories) and a set of sound effects units (e.g., one or more sound effect units) corresponding to each scene element.

In FIG. 2, scene element library 200 includes a plurality of scene element categories: characters (e.g., including characters 1 through N); actions (e.g., including actions 1 through N); objects (e.g., including objects 1 through N); and environment features (e.g., environment features 1 through N).

In some embodiments, the character scene elements correspond to models and representations of different in-game characters and persons (e.g., the user's character or the user's character's opponents and companions). For example, character 1 corresponding to a user created character for a game and the set of sound effect units associated with character 1 includes sound clips of the user created character talking or making noises or transformations to be applied to default sound clips such as differing tempos, accents, pitches, and intonations for customizing the character's voice. For example, character 2 corresponds to character 1's companion. In another example, character 2 corresponds to character 1's opponent.

In some embodiments, the action scene elements correspond to actions performed by the characters. For example, action 1 corresponds to fighting actions such as swordplay or hand-to-hand combat moves and the set of sound effect units associated with action 1 include sword impact and slashing sound clips and first impact sound clips. For example, action 2 corresponds to footsteps and the set of sound effect units associated with action 2 include heavy footsteps, light footsteps, shuffling footsteps, and the like.

In some embodiments, the objects correspond to implements or articles in the game environment such as vehicles, weapons, a character's raiment and armor, and the like. For example, object 1 corresponds to a bolt action rifle and the set of sound effect units associated with object 1 includes handling, cleaning, reloading, firing, recoiling, and spent shell sound clips. For example, object 2 corresponds to a character's horse and the set of sound effect units associated with object 2 includes whinnying, snorting, trotting, and galloping sound clips.

In some embodiments, the environment features correspond to the environment in which the user's character is located in the game such as a forest, a jungle, a serene field, a crowded city street, a battlefield, a castle court or feasting hall, and the like. For example, environment feature 1 corresponds to a battlefield and the set of sound effect units associated with environment feature 1 includes yelling, crying, exploding shells, rally cries, singing, gun fire, projectiles in flight, smoldering fires, and the like. For example, environment feature 2 corresponds to a serene field or meadow and the set of sound effect units associated with environment feature 2 includes birds chirping, bugs buzzing, wind blowing, trees and plants rustling, and the like.

FIG. 3 is a block diagram of a data structure for a respective scene element template 300 in accordance with some embodiments. In some embodiments, each game scene is described by a collection of one or more scene elements. In FIG. 3, scene element template 300 includes a plurality of scene elements arranged according to a time sequence. In FIG. 3, a subset of scene elements is associated with each of the plurality of time intervals in the time sequence.

In some embodiments, each scene element in scene element template 300 includes a pointer to the scene element's corresponding entry in scene element library 200. As such, the electronic device is enabled to obtain one or more sound effect units associated with the scene elements in scene element template 300.

In FIG. 3, a time sequence with a plurality of time intervals 302 (sometimes also called timestamps) (e.g., including time intervals 302-1 through 302-N) corresponds to respective scene element template 300. In FIG. 3, each time interval in the time sequence corresponding to respective scene element template 300 is associated with a subset of scene elements (e.g., one or more scene elements). For example, time interval 302-1 is associated with scene elements 304-1 through 304-M, time interval 302-2 is associated with scene elements 306-1 through 306-M, time interval 302-3 is associated with scene elements 308-1 through 308-M, and time interval 302-N is associated with scene elements 310-1 through 310-M.

For example, scene element template 300 corresponds to a stylized cut-scene prior to a boss fight that ends a level of a game. In this example, the scene includes three time intervals: time interval 302-1 corresponding to the boss flying onto the screen, time interval 302-2 corresponding to the boss jumping out of his vehicle; and time interval 302-3 corresponding to the boss attempting to intimidate the user's character. Continuing with this example, a first subset of scene elements associated with time interval 302-1 includes the boss (e.g., an alien or other monster), the boss' flying craft (e.g., a single occupant hovercraft-like vehicle), the boss' henchmen (e.g., a group of smaller aliens or monster), and a deserted city environment (e.g., a ruined and desolate city). Continuing with this example, a second subset of scene elements associated with time interval 302-2 includes the boss, the boss leaping from the flying craft, the boss shattering the floor upon landing, and the boss' henchman greeting the boss. Continuing with this example, a third subset of scene elements associated with time interval 302-3 includes the boss, the boss transforming into a larger, stronger form, the boss breathing fire, the boss breaking an object over his knee, and the boss cackling at the user's character. In this example, each of the aforementioned scene elements in scene element template 300 includes a pointer to a corresponding scene element in scene element library 200 that is associated with a set of sound effect units. In this example, a composite sound effect is created for the stylized cut-scene corresponding to scene element template 300 by selecting a sound effect unit for each of the scene element in scene element template 300 and concatenating or mixing the sound effect units associated with each time interval.

Figure 4:
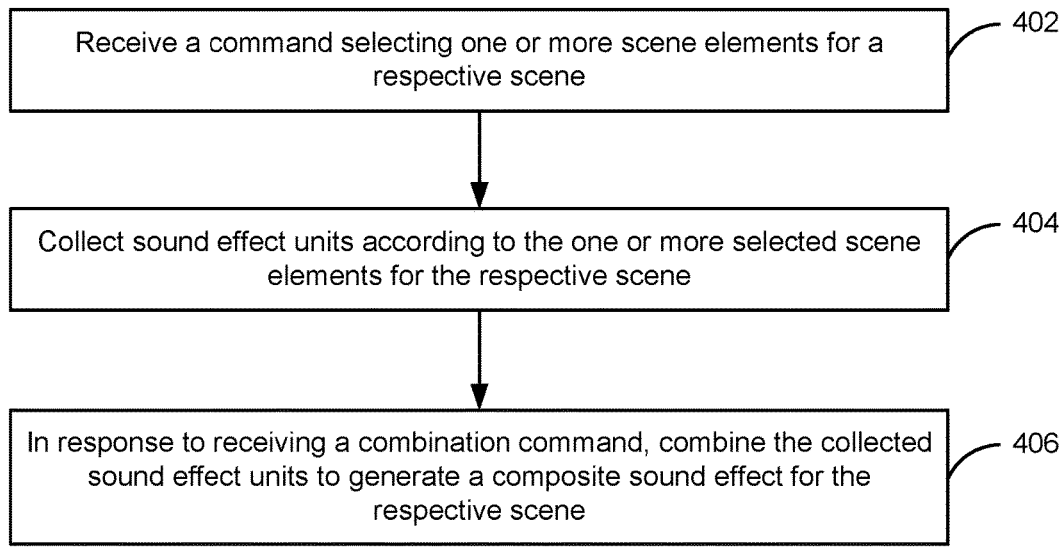
FIG. 4 is a flowchart diagram of a method of generating sound effects for a respective scene of a game in accordance with some embodiments.

FIG. 4 is a flowchart diagram of a method of generating a sound effect for a respective scene of a game in accordance with some embodiments.

In some embodiments, regardless of whether a user plays a multi-player network game (e.g., an MMORPG) or a single player game (e.g., an RPG), the user is required to log into the game via a client-side module associated with the game executed by the client device in order to take part in the game. In some embodiments, the client device stores various files for the game including, without limitation, one or more game music files, video files, system configuration files, user data files, etc. Among which, the one or more game music files include various sound effect files, which include (without limitation) action sound effects as well as environment sound effects.

When development and design personnel (sometimes also referred to as the "developer") need to develop and generate a sound effect file for a game, the developer is involved in making sound effects through an audio processing user interface displayed by an electronic device (e.g., computing device 730, FIGS. 7 and 10) or a component thereof (e.g., audio processing module 600/650, FIG. 10).

In some embodiments, the electronic device receives (402) a command selecting one or more scene elements for a respective scene (e.g., from the developer).

In some embodiments, the scene elements (e.g., in scene element library 200) are saved in the electronic device in advance. In some embodiments, the electronic device is enabled to generate a scene element library for a game that is read from storage media according to in-game scenes or scenarios. In both cases, matching and classifying scene elements to generate scene element library 200 is conducted in accordance with different screening strategies. In some embodiments, the classified scene elements are presented to the developer through an audio processing user interface with a plurality of option buttons of different colors, allowing the developer to select a scene element from multiple option buttons based on different demands. In some embodiments, each type of scene element is displayed with option buttons of the same color (e.g., all action scenes elements are associated with blue buttons and all character scene elements are associated with green buttons). In some embodiments, the option buttons are displayed with the same color and are individually named to distinguish between the option buttons.

For example, when the developer needs to generate a sound effect for a respective scene in a game, the developer is enabled to select scene elements corresponding to the scene from the option buttons in the audio processing user interface. In this example, the electronic device receives the scene element selections from the developer via the user interface.

The electronic device collects (404) sound effect units according to the one or more selected scene elements for the respective scene. In some embodiments, the developer selects different scene elements for a respective scene (e.g., step 402), and in response to these selections, the electronic device is required to collect sound effect units associated with the selected scene elements.

In some embodiments, the respective scene includes a time sequence where a subset of scene elements is associated with each time interval or timestamp in the time sequence. For example, the developer selects a subset of one or more scene elements for a first time interval in the time sequence for the respective scene and a different subset of one or more select different scene elements for the last time interval in the time sequence for the respective scene. Continuing with this example, the electronic device collect sound effect units associated with the two or more subsets of scene elements after the developer selects an affordance or button in the audio processing user interface indicating that the developer is finished selecting scene elements for the respective scene.

The electronic device combines (406) the collected sound effect units to generate a composite sound effect for the respective scene in response to receiving a combination command. In some embodiments, the electronic device generates the composite sound effect for the respective scene by combining the collected sound effect units based on the order in which the scene elements units were selected or intelligently based on the selected scene elements. In some embodiments, the composite sound effect is a concatenation of two or more sound effect units.

The method of generating sound effects provided by the present application allows a developer to select and combine scene elements for a respective scene in a game, followed by generating a sound effect for the respective scene. This allows the developer to generate different sound effects for a respective scene based on scene elements which leads to differing music experience of a player of the game depending on the scene elements of the respective scene. When the developer modifies or generates a new sound effect for a respective scene via the audio processing user interface provided by the electronic device, there is no need to alter the underlying audio files of the game. This improves the efficiency of generating sound effects, and, in addition, there is no need to separately develop each sound effect for a scene instead sound effect units from the original audio files are combined to generate the sound effect for the scene. Thus, development time is reduced, and efficiency of generating sound effects is improved.

Figure 5:
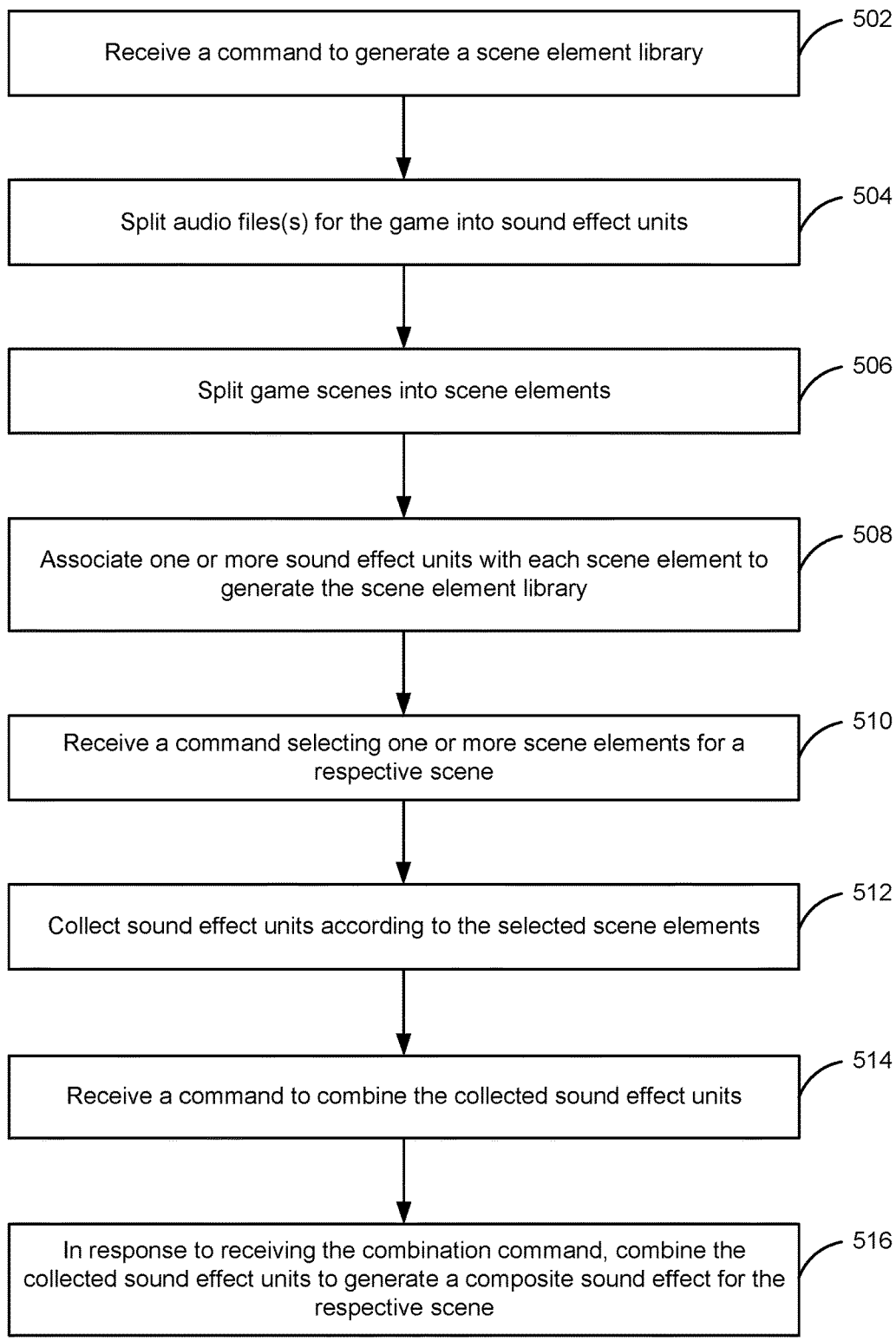
FIG. 5 is a flowchart diagram of a method of generating sound effects for a respective scene of a game in accordance with some embodiments.

FIG. 5 is a flowchart diagram of a method of generating sound effects for a respective scene of a game in accordance with some embodiments.

In some embodiments, regardless of whether a user plays a multi-player network game (e.g., an MMORPG) or a single player game (e.g., an RPG), the user is required to log into the game via a client-side module associated with the game executed by the client device in order to take part in the game. In some embodiments, the client device stores various files for the game including, without limitation, one or more game music files, video files, system configuration files, user data files, etc. Among which, the one or more game music files include various sound effect files, which include (without limitation) action sound effects as well as environment sound effects.

When development and design personnel (sometimes also referred to as the "developer") need to develop and generate a sound effect file for a game, the developer is involved in making sound effects through an audio processing user interface displayed by an electronic device (e.g., computing device 730, FIGS. 7 and 10) or a component thereof (e.g., audio processing module 600/650, FIG. 10).

The electronic device receives (502) a command to generate a scene element library. In some embodiments, the developer sends the command by selecting an affordance or button of the audio processing user interface provided by the electronic device. For example, the audio processing user interface provides an affordance or button (e.g., corresponding to a scene element library generation command) that when selected causes the electronic device to (A) split audio file(s) associated with the game into sound effect units, (B) split game scenes into scene elements, and (C) generate the scene element library by associating one or more sound effect units with each scene element.

The electronic device splits (504) the audio file(s) for the game into sound effect units. For example, the sound effect units are associated with game actions or game environments.

For example, sound effect units associated with game actions include but are not limited to: sound effects of skills of the user's character such as magic spells initiating and releasing, and user's character's opponent being stricken by the magic spell; weapon wielding sound effects such as slashing, waving, dropping, and breaking wind; sound effect of various physical strikes to the user's character and the user's character's opponent; sound effects of various environmental materials fragmenting such as trees splintering, windows shattering, and walls breaking; sound effect of materials exploding such as depth charges, bombs, other munitions, and gasoline or chemical explosions; sound effects of characters falling and moving; sound effects of characters fighting, talking, and shouting; sound effects of footsteps of characters, animals, robots and vehicles moving; and the like.

For example, sound effect units associated with the game environment include but are not limited to: water, forest, horror, weather related (e.g., wind, rain, lightning, snow, etc.), and white noise environmental sound effects.

The electronic device splits (506) scenes of the game into scene elements. For example, for a game scene where the user's character is charging into battle, the scene elements include but are not limited to: the user's character (e.g., a warrior, sorcerer, squire, dragoon, etc.); the user's character's weapon(s); the user's character's raiment and armor; the user's character's vehicle (e.g., a horse, chariot, etc.); the battle's location or surrounding environment (e.g., castle, open field, desolate world, etc.); the user's character's opponent(s); the user's character's companion(s); weapon wielding actions of the user's character and the user's character's opponent (e.g., slash, parry, dodge, stab, etc.); and other scene elements.

The electronic device associates (508) one or more sound effect units with each scene element to generate a scene element library (e.g., scene element library 200). In some embodiments, the associating includes matching and classifying the scene elements with a set of sound effect units according to different screening strategies.

In some embodiments, screening strategy can include matching the sound effect units to scene elements based on different levels or different categories. For example, a set of sound effect units associated with a fire spell action includes: the first fire skill release Effect_Fire_Fire_A, the second fire skill release Effect_Fire_Fire_B, and the third fire skill loop Effect_Fire_Hold_C. In another example, a set of sound effect units associated with a jumping action for a monster includes: a big monster jump Big_M_Jump, a middle monster jump Mid_M_Jump, and small monster jump Small_M_Jump.

In some embodiments, after the electronic device generates the scene element library, an audio processing user interface displayed by the electronic device enables the developer to select scene elements for a respective scene in the game via affordances or option buttons of different colors in the user interface.

The electronic device receives (510) a command selecting one or more scene elements for a respective scene (e.g., from the developer). For example, when the developer needs to generate a sound effect for a respective scene in a game, the developer is enabled to select scene elements corresponding to the scene from the option buttons in the audio processing user interface. In this example, the electronic device receives the scene element selections from the developer via the user interface.

The electronic device collects (512) sound effect units according to the one or more selected scene elements for the respective scene. In some embodiments, the developer selects different scene elements for a respective scene (e.g., step 402), and in response to these selections, the electronic device is required to collect sound effect units associated with the selected scene elements.

In some embodiments, the respective scene includes a time sequence where a subset of scene elements is associated with each time interval or timestamp in the time sequence. For example, the developer selects a subset of one or more scene elements for a first time interval in the time sequence for the respective scene and a different subset of one or more select different scene elements for the last time interval in the time sequence for the respective scene. Continuing with this example, the electronic device collect sound effect units associated with the two or more subsets of scene elements after the developer selects an affordance or button in the audio processing user interface indicating that the developer is finished selecting scene elements for the respective scene.

The electronic device receives (514) a command to combine the collected sound effect units. In some embodiments, the developer sends the command by selecting an affordance or button of the audio processing user interface provided by the electronic device. For example, the audio processing user interface provides an affordance or button (e.g., corresponding to a combination command) that when selected causes the electronic device to combine the sound effect elements of the collected sound effect elements for the one or more selected scene elements of the respective scene to generate a composite sound effect for the respective scene.

The electronic device combines (516) the collected sound effect units to generate a composite sound effect for the respective scene in response to receiving a combination command. In some embodiments, the electronic device generates the composite sound effect for the respective scene by combining the collected sound effect units based on the order in which the scene elements units were selected or intelligently based on the selected scene elements. In some embodiments, the composite sound effect is a concatenation of two or more sound effect units.

In one example, a sound effect for a game scene of a monster attacking the user's character includes a subset one or more scene elements at each of two time intervals for the game scene. In this example, a first time interval for the monster jumping into the air includes "jump" and "monster shouting" scene elements, and the second time interval for the monster landing includes "weapon breaking wind," "monster shouting," "ground exploding," "rock fragmenting," and "landing" scene elements. In this example, sound effect units for the scene elements in the first time interval are concatenated, and sound effect units for the scene elements in the second time interval are concatenated. The two sequences of concatenated sound effect units are combined to generate a composite sound effect for the game scene corresponding to the monster attacking the user's character.

In another example, a sound effect for a game scene introducing a hell environment in the game includes a plurality of scene elements. In this example, the game scene is a stylized cut-scene shown upon the user completing a previous level and the user's character starting a new level. Continuing with this example, the scene elements for the game scene include "wind environment," "low sound environment," "horror environment," and "magma environment." In this example, the sound effect units are concatenated to generate a composite sound effect for the game scene corresponding to introducing the hell environment (e.g., the start of a new level).

The method of generating sound effects provided by the present application allows a developer to select and combine scene elements for a respective scene in a game, followed by generating a sound effect for the respective scene. This allows the developer to generate different sound effects for a respective scene based on scene elements which leads to differing music experience of a player of the game depending on the scene elements of the respective scene. When the developer modifies or generates a new sound effect for a respective scene via the audio processing user interface provided by the electronic device, there is no need to alter the underlying audio files of the game. This improves the efficiency of generating sound effects, and, in addition, there is no need to separately develop each sound effect for a scene instead sound effect units from the original audio files are combined to generate the sound effect for the scene. Thus, development time is reduced, and efficiency of generating sound effects is improved.

Figure 6A:
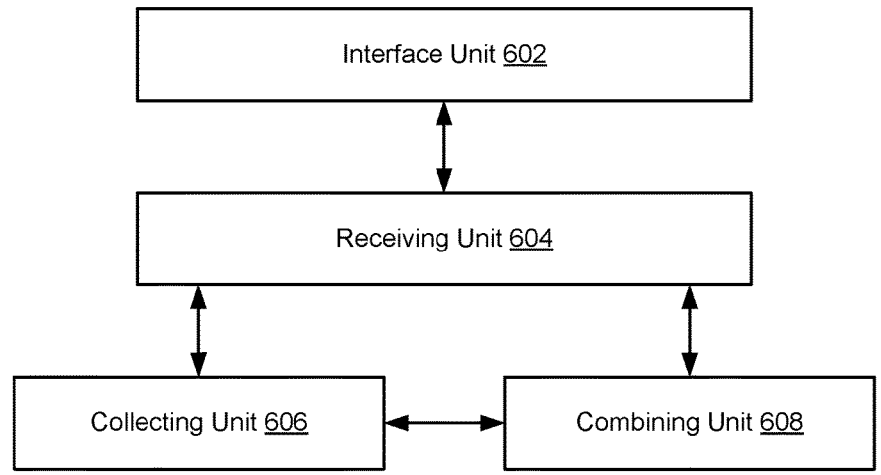
FIG. 6A is a structural diagram of an audio processing module for generating sound effects for a respective scene of a game in accordance with some embodiments.

FIG. 6A is a structural diagram of an audio processing module 600 for generating sound effects for a game in accordance with some embodiments.

In some embodiments, audio processing module 600 includes interface unit 602, receiving unit 604, collecting unit 606, and combining unit 608. In some embodiments, audio processing module 600 is a component of computing device 730 as shown in FIG. 10.

Interface unit 602 is configured to provide an audio processing user interface for generating sound effects for the respective game. In some embodiments, the audio processing user interface is displayed by an output device (e.g., a touch-screen display) of computing device 730 which is associated with a developer. For example, the audio processing user interface includes a plurality of affordances option buttons for selecting scene elements for a respective scene and one or more command affordances or buttons for performing different audio processing commands (e.g., scene element library generation and combination commands).

Receiving unit 604 is configured to receive user interactions with affordances and buttons of the user interface by an input device (e.g., a touch-screen display) of computing device 730 which is associated with a developer. In some embodiments, the affordances and buttons of the user interface correspond to commands (e.g., scene element library generation and combination commands) and scene elements.

Collecting unit 606 is configured to collect one or more sound effect units corresponding to each of the selected scene elements. In some embodiments, the developer selects one or more option buttons on the user interface corresponding to scene elements for a respective scene and in response to these selections, collection unit 606 collects sound effect units associated with the selected scene elements.

Combining unit 608 is configured to combine the collected sound effect units to generate a composite sound effect for the respective scene. In some embodiments, combining unit 608 is also configured to store the composite sound effect as a sound effect file corresponding to the respective scene. In some embodiments, the electronic device generates the composite sound effect for the respective scene by combining the sound effect units based on the order in which the scene elements units were selected or intelligently based on the selected scene elements. In some embodiments, the composite sound effect is a concatenation of two or more sound effect units.

The method of generating sound effects provided by the present application allows a developer to select and combine scene elements for a respective scene in a game, followed by generating a sound effect for the respective scene. This allows the developer to generate different sound effects for a respective scene based on scene elements which leads to differing music experience of a player of the game depending on the scene elements of the respective scene. When the developer modifies or generates a new sound effect for a respective scene via the audio processing user interface provided by the electronic device, there is no need to alter the underlying audio files of the game. This improves the efficiency of generating sound effects, and, in addition, there is no need to separately develop each sound effect for a scene instead sound effect units from the original audio files are combined to generate the sound effect for the scene. Thus, development time is reduced, and efficiency of generating sound effects is improved.

Figure 6B:
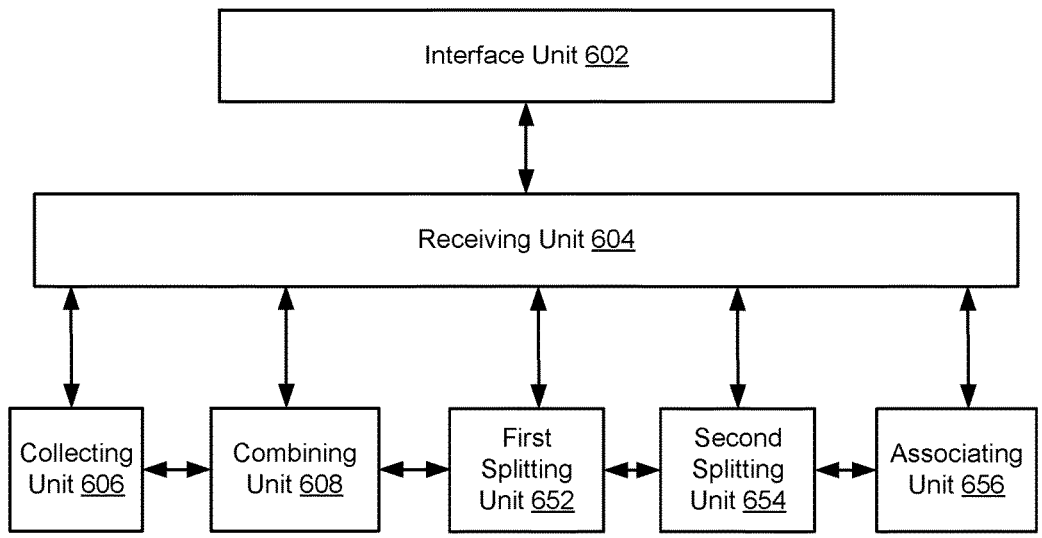
FIG. 6B is a structural diagram of an audio processing module for generating sound effects for a respective scene of a game in accordance with some embodiments.

FIG. 6B is a structural diagram of an audio processing module 650 for generating sound effects for a game in accordance with some embodiments.

In some embodiments, audio processing module 650 is similar to audio processing module 600 shown in FIG. 6A in that audio processing module 650 includes interface unit 602, receiving unit 604, collecting unit 606 and combining unit 608. However, audio processing module 650 additionally includes a first splitting unit 652, a second splitting unit 654, and an associating unit 656. In some embodiments, audio processing module 600 is a component of computing device 730 as shown in FIG. 10.

First splitting unit 652 is configured to split the audio file(s) for the game into sound effect units. For example, the sound effect units are associated with game actions or game environments.

Second splitting unit 654 is configured to split scenes of the game into scene elements. In some embodiments, the game comprises one or more video files for rendering the game. For example, second splitting unit 654 determines a plurality of scenes in the one or more video files and splits the plurality of scenes into scene elements.

Associating unit 656 is configured to associate one or more sound effect units with each scene element to generate a scene element library. In some embodiments, the associating includes matching and classifying the scene elements with a set of sound effect units according to different screening strategies.

The method of generating sound effects provided by the present application allows a developer to select and combine scene elements for a respective scene in a game, followed by generating a sound effect for the respective scene. This allows the developer to generate different sound effects for a respective scene based on scene elements which leads to differing music experience of a player of the game depending on the scene elements of the respective scene. When the developer modifies or generates a new sound effect for a respective scene via the audio processing user interface provided by the electronic device, there is no need to alter the underlying audio files of the game. This improves the efficiency of generating sound effects, and, in addition, there is no need to separately develop each sound effect for a scene instead sound effect units from the original audio files are combined to generate the sound effect for the scene. Thus, development time is reduced, and efficiency of generating sound effects is improved.

As shown in FIG. 7, in some embodiments, data processing for a game (or application) is implemented in a server-client environment 700. Data processing for the game includes client-side game processing 704-1, 704-2 (hereinafter "client-side module 704") executed on a client device 702-1, 702-2 and server-side game processing 708 (hereinafter "server-side module 708") executed on a server system 706. Client-side module 704 communicates with server-side module 708 through one or more networks 710. Client-side module 704 provides client-side functionalities associated with a game such as client-facing input and output processing, communications with server-side module 708, and audio processing. Server-side module 708 provides server-side functionalities associated with the game such as game play coordination for any number of client modules 704 each residing on a respective client device 702.

In some embodiments, server-side module 708 includes processor(s) 712, user data 714, game data 716, an I/O interface to client(s) 718, and an I/O interface to developer(s) 720. I/O interface to client(s) 718 facilitates the client-facing input and output processing for server-side module 708. Processor(s) 712 receive requests from client-side module 704 associated with playing a game and coordinating game play between client modules 704. User data 714 stores data received from client-side modules 704 (e.g., game play parameters) and game data 716 stores data associated with the game. In some embodiments, server-side module 708 communicates with computing device 730 (e.g., associated with developer(s) of the game) through one or more networks 710. For example, computing device 720 provides updates to game data 716 such as new or modified audio files with new sound effects. I/O interface to system developer(s) 720 facilitates such communications.

Examples of client device 702 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 710 include local area networks ("LAN") and wide area networks ("WAN") such as the Internet. One or more networks 710 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi Fi, voice over Internet Protocol (VoIP), Wi-MAX, or any other suitable communication protocol.

Server system 706 is implemented on one or more stand-alone data processing apparatuses or a distributed network of computers. In some embodiments, server system 706 also employs various virtual devices and/or services of third party service providers (e.g., third-party cloud service providers) to provide the underlying computing resources and/or infrastructure resources of server system 706.

Although server-client environment 700 shown in FIG. 7 includes both a client-side portion (e.g., client-side module 704) and a server-side portion (e.g., server-side module 708), in some embodiments, data processing is implemented as a standalone application installed on user device 702. In addition, the division of functionalities between the client and server portions of client environment data processing can vary in different embodiments. For example, in some embodiments, client-side module 704 is a thin-client that provides only user-facing input and output processing functions, and delegates all other data processing functionalities to a backend server (e.g., server system 706).

Figure 8:
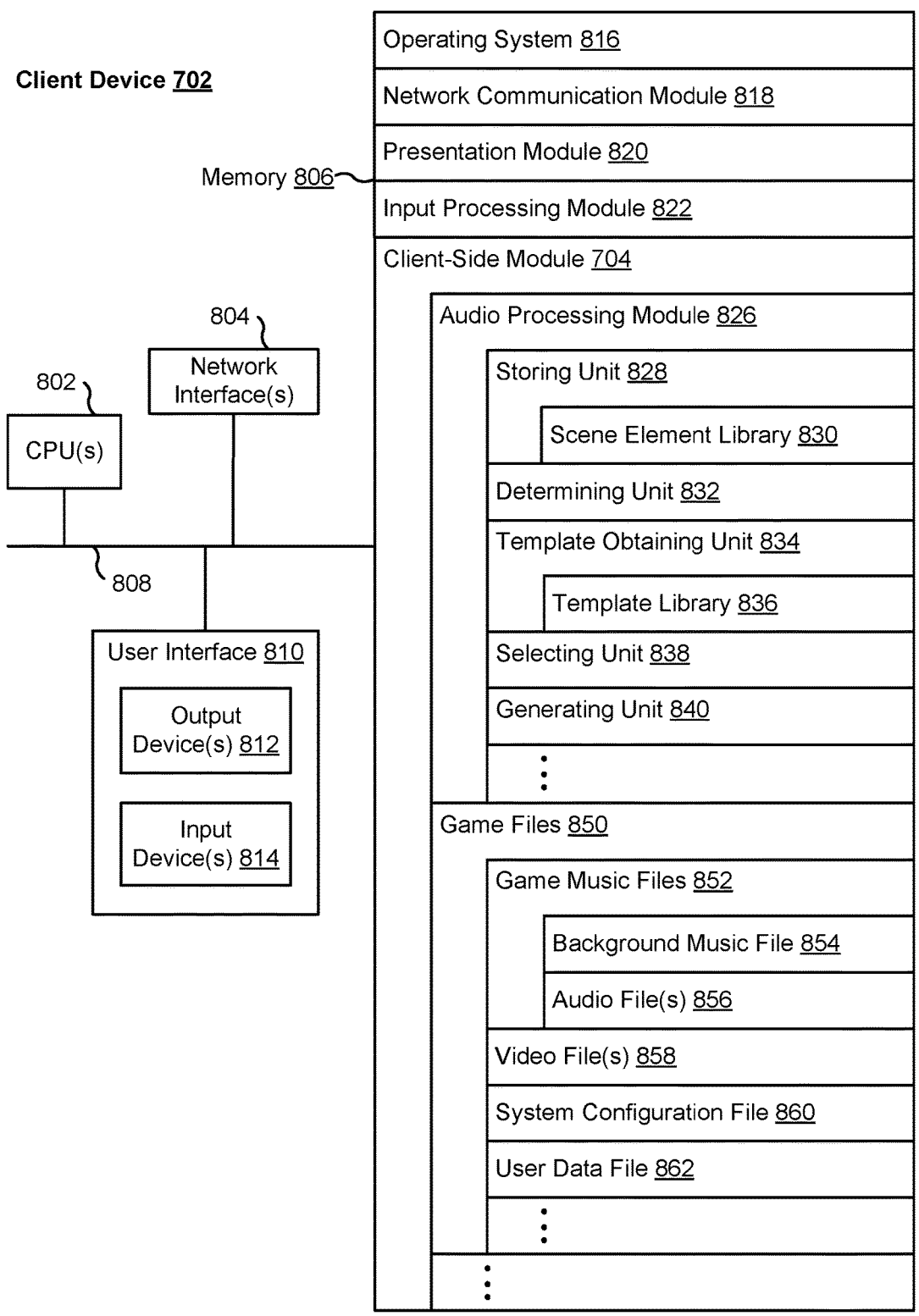
FIG. 8 is a block diagram of a client device in accordance with some embodiments.

FIG. 8 is a block diagram illustrating a representative client device 702 associated with a user in accordance with some embodiments. Client device 702, typically, includes one or more processing units (CPUs) 802, one or more network interfaces 804, memory 806, and one or more communication buses 808 for interconnecting these components (sometimes called a chipset). Client device 702 also includes a user interface 810. User interface 810 includes one or more output devices 812 that enable presentation of media content, including one or more speakers and/or one or more visual displays. User interface 810 also includes one or more input devices 814, including user interface components that facilitate user input such as a keyboard, a mouse, a voice-command input unit or microphone, a touch-screen display, a touch-sensitive input pad, a gesture capturing camera, or other input buttons or controls. Furthermore, some client devices 702 use a microphone and voice recognition or a camera and gesture recognition to supplement or replace the keyboard. Memory 806 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 806, optionally, includes one or more storage devices remotely located from CPU(s) 802. Memory 806, or alternately the non-volatile memory device(s) within memory 806, includes a non-transitory computer readable storage medium. In some implementations, memory 806, or the non-transitory computer readable storage medium of memory 806, stores the following programs, modules, and data structures, or a subset or superset thereof:

an operating system 816 including procedures for handling various basic system services and for performing hardware dependent tasks;

a network communication module 818 for connecting user device 702 to other computing devices (e.g., server system 706) connected to one or more networks 710 via one or more network interfaces 804 (wired or wireless);

a presentation module 820 for enabling presentation of information (e.g., a user interface for a web page or an application program, a game, audio and/or video content, text, etc.) at client device 702 via one or more output devices 812 (e.g., displays, speakers, etc.) associated with user interface 810; and an input processing module 822 for detecting one or more user inputs or interactions from one of the one or more input devices 814 and interpreting the detected input or interaction.

In some embodiments, memory 806 also includes a client-side module 704 for performing data processing for a respective game (or application) being executed by the user of client device 702. Client-side module 704 includes, but is not limited to:

audio processing module 826 for generating audio (e.g., sound effects) for the respective game, including but not limited to:
- a storing unit 828 for storing a scene element library 830, including a plurality of scene elements and a corresponding set of sound effect units for each scene element;
- a determining unit 832 for determining a respective scene in the game being played by the user of client device 702;
- a template obtaining unit 834 for obtaining a scene element template (e.g., including one or more scene elements) that corresponds to the respective in-game scene, optionally including a template library 836 (e.g., including a plurality of scene element templates);
- a selecting unit 838 for selecting one or more corresponding sound effect units for each of the one or more constituent scene elements in the scene element template for the respective in-game scene; and
- a generating unit 840 for generating a composite sound effect for the respective in-game scene using the selected sound effect units and storing the composite sound effect as a sound effect file associated with the respective scene in audio file(s) 856; and game files 850 corresponding to the respective game, including but not limited to:
- game music files 852, including but not limited to:
  - a background music file 854 including a soundtrack or a plurality of music files to be played in the background while playing the respective game; and
  - one or more audio files 856 including sound effect files and/or sound clips for various scenes or events in the respective game (e.g., at least one sound effect file for each scene);
- one or more video files 858 including information for rendering the respective game;
- a system configuration file 860 including a plurality of parameters associated with audio processing; and
- a user data file 862 including information associated with the user's in-game actions.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 806, optionally, stores a subset of the modules and data structures identified above. Furthermore, memory 806, optionally, stores additional modules and data structures not described above.

Figure 9:
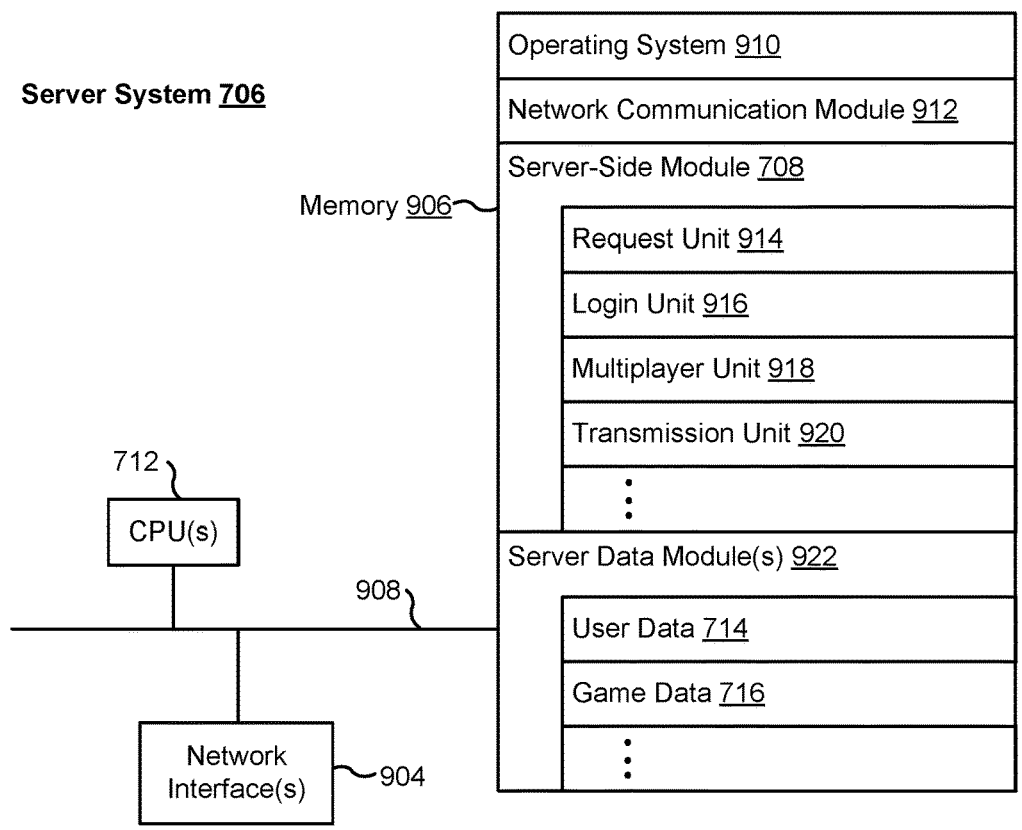
FIG. 9 is a block diagram of a server system in accordance with some embodiments.

FIG. 9 is a block diagram illustrating server system 706 in accordance with some embodiments. Server system 706, typically, includes one or more processing units (CPUs) 712, one or more network interfaces 904 (e.g., including I/O interface to client(s) 718 and I/O interface to developer(s) 720), memory 906, and one or more communication buses 908 for interconnecting these components (sometimes called a chipset). Memory 906 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 906, optionally, includes one or more storage devices remotely located from the CPU(s) 712. Memory 906, or alternately the non-volatile memory device(s) within memory 906, includes a non-transitory computer readable storage medium. In some implementations, memory 906, or the non-transitory computer readable storage medium of memory 906, stores the following programs, modules, and data structures, or a subset or superset hereof:

- an operating system 910 including procedures for handling various basic system services and for performing hardware dependent tasks;
- a network communication module 912 that is used for connecting server system 706 to other computing devices (e.g., client devices 702 and computing device 730) connected to one or more networks 710 via one or more network interfaces 904 (wired or wireless);
- a server-side module 708 for performing data processing for a respective game (or application), including but not limited to:
  - a request unit 914 for receiving requests from client devices 702;
  - a login unit 916 for authenticating user credentials for game play;
  - an multiplayer unit 918 for coordinating communication between client modules and enabling multiple players to play a same game session; and
  - a transmission unit 920 for sending data to client devices 702; and
- one or more server data modules 922 for storing data related to server system 706, including but not limited to:
  - user data 714 including data associated with users playing the game; and
  - game data 716 including information for rendering and executing the game.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 906, optionally, stores a subset of the modules and data structures identified above. Furthermore, memory 906, optionally, stores additional modules and data structures not described above.

FIG. 10 is a block diagram illustrating a computing device 730 (e.g., associated with a developer of a respective game) in accordance with some embodiments. Computing device 730, typically, includes one or more processing units (CPUs) 1002, one or more network interfaces 1004, memory 1006, and one or more communication buses 1008 for interconnecting these components (sometimes called a chipset). Computing device 730 also includes a user interface 1010. User interface 1010 includes one or more output devices 1012 that enable presentation of media content, including one or more speakers and/or one or more visual displays. User interface 1010 also includes one or more input devices 1014, including user interface components that facilitate user input such as a keyboard, a mouse, a voice-command input unit or microphone, a touch-screen display, a touch-sensitive input pad, a gesture capturing camera, or other input buttons or controls. Memory 1006 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 1006, optionally, includes one or more storage devices remotely located from CPU(s) 1002. Memory 1006, or alternately the non-volatile memory device(s) within memory 1006, includes a non-transitory computer readable storage medium. In some implementations, memory 1006, or the non-transitory computer readable storage medium of memory 1006, stores the following programs, modules, and data structures, or a subset or superset thereof:

- an operating system 1016 including procedures for handling various basic system services and for performing hardware dependent tasks; and
- a network communication module 1018 for connecting computing device 730 to other computing devices (e.g., server system 706) connected to one or more networks 710 via one or more network interfaces 1004 (wired or wireless).

In some embodiments, memory 1006 also includes an audio processing module 600/650 for generating audio (e.g., sound effects) for a respective game (or application). Audio processing module 600/650 includes, but is not limited to:

- an interface unit 602 for enabling presentation of information (e.g., an audio processing user interface for generating sound effects for the respective game) at computing device 730 via one or more output devices 1012 (e.g., displays, speakers, etc.) associated with user interface 1010;
- a receiving unit 604 for receiving commands (e.g., scene element library generation or combination commands) from a user of computing device 730 by detecting one or more user inputs or interactions with the user interface generated by interface unit 602 and interpreting the detected input or interaction;
- a scene element library generating unit 1026 for generating and storing a scene element library 1030, including but not limited to:
  - a first splitting unit 652 for splitting the audio file(s) for the game into sound effect units;
  - a second splitting unit 654 for splitting scenes of the game into scene elements;
  - an associating unit 656 for associating one or more sound effect units with each scene element to generate a scene element library 1030; and
  - scene element library 1030 including a plurality of scene elements and a corresponding set of sound effect units for each scene element;
- a storing unit 828 for storing scene element library 1030;
- a template obtaining unit 834 for generating a scene element template (e.g., including one or more scene elements) for a respective in-game scene and storing the scene element template in template library 1034 (e.g., including a plurality of scene element templates for the respective game);
- a collecting unit 606 for collecting one or more sound effect units corresponding to each of the selected scene elements;
- a combining unit 608 for combining the collected sound effect units to generate a composite sound effect for the respective scene and storing the composite sound effect as a sound effect file associated with the respective scene in audio file(s) 1046; and
- game files 1040 corresponding to the respective game, including but not limited to:
  - game music files 1042, including but not limited to:
    - a background music file 1044 including a soundtrack or a plurality of music files to be played in the background while playing the respective game; and
    - one or more audio files 1046 including sound effect files and/or sound clips for various scenes or events in the respective game (e.g., at least one sound effect file for each scene);
  - one or more video files 1048 including information for rendering the respective game; and
  - a system configuration file 1050 including a plurality of parameters associated with audio processing.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 1006, optionally, stores a subset of the modules and data structures identified above. Furthermore, memory 1006, optionally, stores additional modules and data structures not described above.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method of sound effect production for games, comprising:
   at an electronic device with one or more processors and memory:
   identifying a plurality of scene elements within a plurality of sample game scenes within a game and a plurality of sound effect units within a plurality of audio files existing in the game;
   generating a scene element library containing one or more of the plurality of sound effect units in association with each of a plurality of scene elements in accordance with a predefined matching strategy, the scene element library including a list of possible scene elements for constructing game scenes;

obtaining a scene element template for a respective scene in the game, the scene element template including one or more constituent scene elements of the respective scene;

selecting one or more corresponding sound effect units for each of the one or more constituent scene elements in the scene element template for the respective scene, further including selecting at least one of the one or more sound effect units for a first one of the one or more constituent scene elements in the scene element template in accordance with user feedback from a community of users; and generating a composite sound effect for the respective scene using the selected sound effect units.

2. The method of claim 1, further comprising:

determining the respective scene; and wherein obtaining the scene element template for the respective scene includes generating the scene element template based on the determined respective scene.

3. The method of claim 1, wherein the one or more scene elements in the scene element template are arranged according to a time sequence with a plurality of time intervals.

4. The method of claim 3, wherein two or more scene elements are associated with a same time interval of the plurality of time intervals in the time sequence.

5. The method of claim 1, wherein the composite sound effect is dynamically generated during game play.

6. The method of claim 1, wherein each of the selected sound effect units is randomly selected from a set of respective sound effect units stored in association with a respective constituent scene element of the scene element template.

7. An electronic device, comprising:

one or more processors; and memory storing one or more programs to be executed by the one or more processors, the one or more programs comprising instructions for:

identifying a plurality of scene elements within a plurality of sample game scenes within a game and a plurality of sound effect units within a plurality of audio files existing in the game;

generating a scene element library containing one or more of the plurality of sound effect units in association with each of a plurality of scene elements in accordance with a predefined matching strategy, the scene element library including a list of possible scene elements for constructing game scenes;

obtaining a scene element template for a respective scene in the game, the scene element template including one or more constituent scene elements of the respective scene;

selecting one or more corresponding sound effect units for each of the one or more constituent scene elements in the scene element template for the respective scene, further including selecting at least one of the one or more sound effect units for a first one of the one or more constituent scene elements in the scene element template in accordance with user feedback from a community of users; and generating a composite sound effect for the respective scene using the selected sound effect units.

8. The electronic device according to claim 7, wherein the instructions further comprise:

determining the respective scene; and wherein obtaining the scene element template for the respective scene includes generating the scene element template based on the determined respective scene.

9. The electronic device according to claim 7, wherein the one or more scene elements in the scene element template are arranged according to a time sequence with a plurality of time intervals.

10. The electronic device according to claim 9, wherein two or more scene elements are associated with a same time interval of the plurality of time intervals in the time sequence.

11. The electronic device according to claim 7, wherein the composite sound effect is dynamically generated during game play.

12. The electronic device according to claim 7, wherein each of the selected sound effect units is randomly selected from a set of respective sound effect units stored in association with a respective constituent scene element of the scene element template.

13. A non-transitory computer readable storage medium storing one or more programs, the one or more programs comprising instructions, which, when executed by an electronic device with one or more processors, cause the electronic device to perform operations comprising:

storing one or more respective sound effect units in association with each of a plurality of scene elements used in a game;

obtaining a scene element template for a respective scene in the game, the scene element template including one or more constituent scene elements of the respective scene;

selecting one or more corresponding sound effect units for each of the one or more constituent scene elements in the scene element template for the respective scene; and generating a composite sound effect for the respective scene using the selected sound effect units;

identifying a plurality of scene elements within a plurality of sample game scenes within a game and a plurality of sound effect units within a plurality of audio files existing in the game;

generating a scene element library containing one or more of the plurality of sound effect units in association with each of a plurality of scene elements in accordance with a predefined matching strategy, the scene element library including a list of possible scene elements for constructing game scenes;

obtaining a scene element template for a respective scene in the game, the scene element template including one or more constituent scene elements of the respective scene;

selecting one or more corresponding sound effect units for each of the one or more constituent scene elements in the scene element template for the respective scene, further including selecting at least one of the one or more sound effect units for a first one of the one or more constituent scene elements in the scene element template in accordance with user feedback from a community of users; and generating a composite sound effect for the respective scene using the selected sound effect units.

14. The non-transitory computer readable storage medium of claim 13, wherein the operations further comprise:

determining the respective scene; and wherein obtaining the scene element template for the respective scene includes generating the scene element template based on the determined respective scene.

15. The non-transitory computer readable storage medium of claim 13, wherein the one or more scene elements in the scene element template are arranged according to a time sequence with a plurality of time intervals.

16. The non-transitory computer readable storage medium of claim 15, wherein two or more scene elements are associated with a same time interval of the plurality of time intervals in the time sequence.

17. The non-transitory computer readable storage medium of claim 13, wherein the composite sound effect is dynamically generated during game play.

18. The non-transitory computer readable storage medium of claim 13, wherein each of the selected sound effect units is randomly selected from a set of respective sound effect units stored in association with a respective constituent scene element of the scene element template.

* * * * *